(12) United States Patent
Frederix et al.

(10) Patent No.: US 7,319,527 B2
(45) Date of Patent: Jan. 15, 2008

(54) SENSOR WITH CANTILEVER AND OPTICAL RESONATOR

(75) Inventors: Patrick Louis Theodorus Martin Frederix, Riehen (CH); Hans Joseph Hug, Reinach (CH)

(73) Assignee: University of Basel, Basel (CH)

( * ) Notice: Subject to any disclaimer, the term of this patent is extended or adjusted under 35 U.S.C. 154(b) by 334 days.

(21) Appl. No.: 10/524,506

(22) PCT Filed: Aug. 14, 2002

(86) PCT No.: PCT/IB02/03253

§ 371 (c)(1),
(2), (4) Date: Feb. 14, 2005

(87) PCT Pub. No.: WO2004/017329

PCT Pub. Date: Feb. 26, 2004

(65) Prior Publication Data

US 2005/0264825 A1 Dec. 1, 2005

(51) Int. Cl.
*G01B 11/02* (2006.01)
(52) U.S. Cl. .................................. 356/501
(58) Field of Classification Search ............ 356/480, 356/519, 501; 250/201.3, 306; 73/105
See application file for complete search history.

(56) References Cited

U.S. PATENT DOCUMENTS 5,166,516 A 11/1992 Kajimura
5,465,611 A 11/1995 Ruf et al.
5,560,244 A 10/1996 Prater et al.
5,565,987 A 10/1996 Jain et al.
6,713,743 B2 * 3/2004 Kim et al. .............. 250/201.3
2002/0000511 A1 1/2002 Schaffer et al.

FOREIGN PATENT DOCUMENTS

EP 0 398 085 A1 11/1990
EP 0557743 9/1993

OTHER PUBLICATIONS

Rugar D.; Mamin H. J.; and Guethner P., Improved fiber-optic interferometer for atomic force microscopy, Applied Physics Letters, vol. 55, Issue 25, pp. 2588-2590 (Dec. 18, 1989).
Rugar, D.; Mamin, H. J.; Erlandsson, R.; Stern, J. E.; Terris, B. D., Force microscope using a fiber-optic displacement sensor, Review of Scientific Instruments, vol. 59, Issue 11, pp. 2337-2340 (Nov. 1988).

* cited by examiner

*Primary Examiner*—Tarifur Chowdhury
*Assistant Examiner*—Jonathon D Cook
(74) *Attorney, Agent, or Firm*—Joyce von Natzmer; Pequignot + Myers LLC

(57) ABSTRACT

An optical sensor, in particular for a scanning force microscope, measures the deflection of a cantilever (3) using an optical resonator between the cantilever (3) and an output surface (12*b*) of a lens assembly (10). In order to form the resonator, output surface (12*b*) is concave and parallel to the wavefronts of the light within the resonator. This design provides a resonator of high stability and allows to keep the distance between lens assembly (10) and cantilever (3) comparatively large.

12 Claims, 1 Drawing Sheet

SENSOR WITH CANTILEVER AND OPTICAL RESONATOR

This application is the U.S. national stage application of International Application PCT/IB2002/003253, filed Aug. 14, 2002, designating the United States.

TECHNICAL FIELD

The present invention relates to a sensor with cantilever and optical resonator in which the position of the cantilever depends on a parameter to be measured, the optical resonator is formed between two reflecting mirrors and a first mirror is arranged on the cantilever.

BACKGROUND OF THE INVENTION

Sensors with cantilever and optical resonator are e.g. used in scanning force microscopy applications, in particular for atomic force microscopes or molecular force microscopes or other types of surface scanning force microscopes, but also in cantilever-based chemical, physical or biological sensors.

In this type of devices small changes of position of the cantilever, in particular due to a deflection, must be detected.

It is noteworthy that such a sensor can also be used to measure the deflection of the cantilever as a function of the position of the light spot on the cantilever. Therefore, different bending modes of the cantilever can be measured. This allows, for example, friction measurements (torsion of the cantilever) and the detection of various oscillation modes (longitudinal fundamental and higher orders as well as torsional).

D. Rugar et al. in Rev. Sci. Instrum. 59(11), 1988, pp. 2337ff and D. Rugar et al. in Appl. Phys. Lett. 55(25), 1989, pp. 2588ff and EP 398 085 describe a sensor head where the end of an optical fiber is arranged close to the cantilever. Light emitted from the fiber end is reflected from the cantilever and sent back into the fiber where it interferes with light reflected from the fiber-air interface. The interference pattern can be used to measure the position of the cantilever.

In another known embodiment, the sensor head comprises an optical resonator, a first mirror of which is arranged on the surface of the cantilever. Sensors with optical resonators are disclosed in U.S. Pat. No. 5,565,987 and U.S. Pat. No. 5,465,611. If the finesse of the resonator is sufficiently high, it can be used to detect even very fine movements of the cantilever.

However, it has been found that the stability of this type of resonators is poor and depends critically on the relative (Cartesian and angular) position of the cantilever and the sensor, which affects the reliability of the device. And, if a fiber is used, it has to be brought very close to the cantilever and strong movements of the cantilever can damage the fiber end.

In addition, electrostatic and other interactions between the fiber and the cantilever may occur that change the mechanical properties of the cantilever.

SUMMARY OF THE INVENTION

Hence, it is a general object of the invention to provide a sensor of the type mentioned above that allows an accurate detection of the cantilever movement.

Now, in order to implement these and still further objects of the invention, which will become more readily apparent as the description proceeds, a sensor head according to claim 1 is proposed.

Hence, the second mirror of the sensor's optical resonator is formed by the concave output surface of the lens assembly. In order to form a resonator mirror, the output surface should be substantially parallel to the wavefronts of a standing optical wave in the resonator.

Preferably, the lens assembly comprises an output lens having a convex entry surface and a concave exit surface, the latter forming the exit surface of the lens assembly. This lens can transform a parallel or divergent light beam into a convergent light beam focussed on the cantilever.

In order to increase the finesse of the resonator, the output surface is preferably coated with a reflective coating.

In the description and claims, the term "lens assembly" is understood to comprise a single lens or a plurality of lenses.

BRIEF DESCRIPTION OF THE DRAWING

The invention will be better understood and objects other than those set forth above will become apparent when consideration is given to the following detailed description thereof. Such description makes reference to the annexed drawing, FIG. 1, which shows part of a scanning microscope according to the present invention, the individual components of which are represented schematically and not to scale.

DESCRIPTION OF VARIOUS AND PREFERRED EMBODIMENTS OF THE INVENTION

Figure 1:
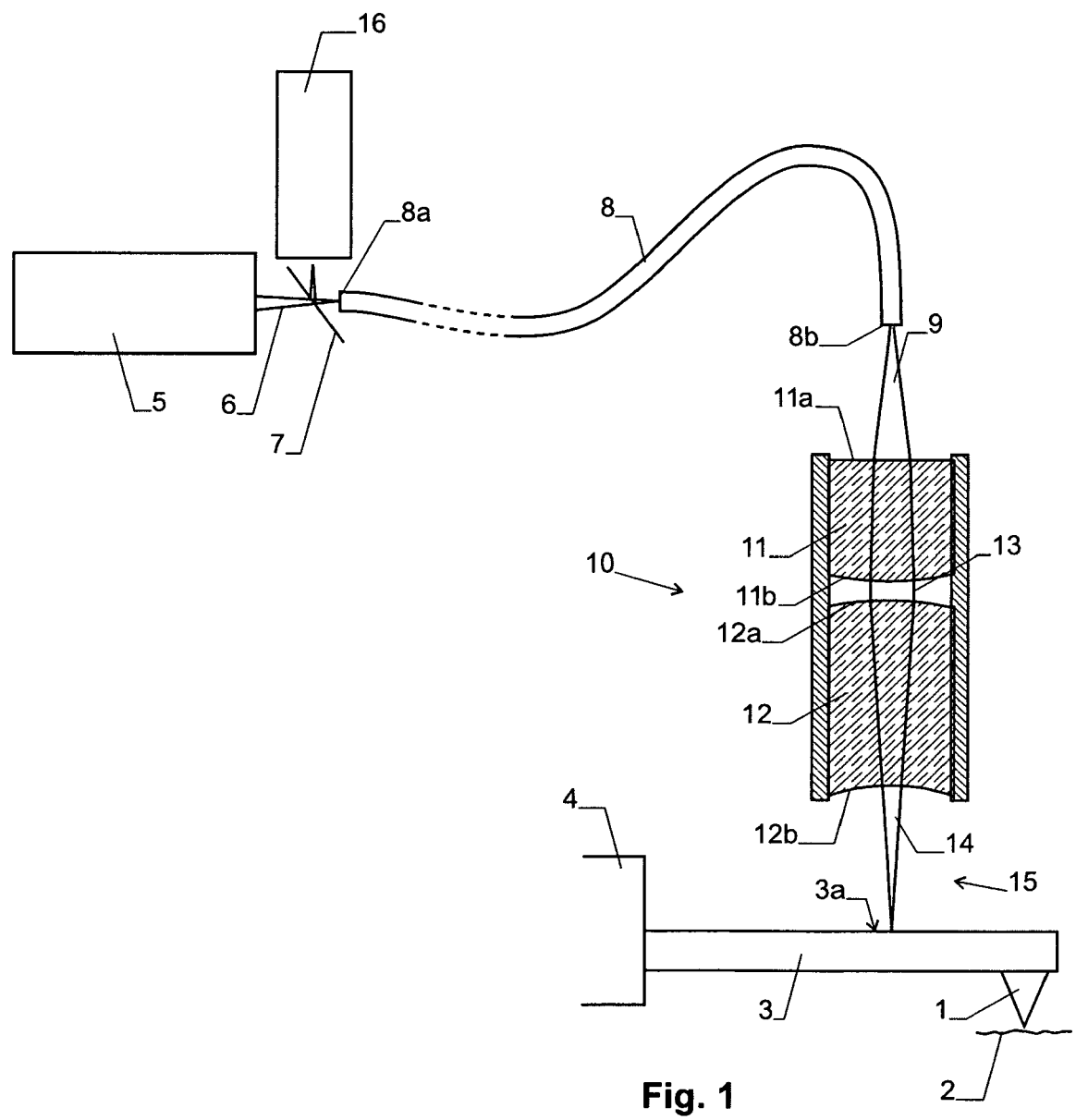
FIG. 1 shows a scanning microscope, in particular an atomic force microscope. It comprises a tip 1 for scanning a surface 2. Tip 1 is attached to a cantilever 3 carried by a scan head 4. The position of cantilever 3 depends on the force exerted by surface 2 on tip 1. This force causes a deviation of cantilever 3 from its neutral position.

An optical sensor is provided for detecting this deviation. The optical sensor comprises a light source 5 emitting light 6 with a temporal coherency sufficient for operating the resonator described below. The light from source 5 passes a beam splitter 7 and is focussed into a first end 8a of a fiber 8. Preferably, a TEM mode of fiber 8 is used for transmitting the light.

A light cone 9 exits from the second end 8b of fiber 8. Light cone 9 impinges on a lens assembly 10, which focuses it onto a flat top surface 3a of cantilever 3.

Lens assembly 10 is attached to scan head 4. It comprises an input lens 11 and an output lens 12, which optically project second end 8b of optical fiber 8 onto cantilever 3.

Input lens 11 has a flat input face 11a and a convex output face 11b. It receives the divergent light from light cone 9 and projects it as an e.g. parallel beam 13 onto output lens 12.

Output lens 12 has a convex input face 12a and a concave output face 12b, the latter being the output surface of lens assembly 10. It focuses light beam 13 onto surface 3a of cantilever 3.

The curvature of output surface 12b is chosen such that it is parallel to the wavefronts of the light 14 exiting therefrom, i.e. it does not break the light beams going through it. Output surface 12b is coated with a partially, preferably highly reflecting coating and top surface 3a of cantilever 3 is reflecting, preferably highly reflecting, e.g. by also being covered by an reflective optical coating. As a result, an optical resonator 15 is formed between output surface 12b and top surface 3a of cantilever 3. The resonator has low loss (e.g. less than 20% per roundtrip, preferably less than 10%).

As known to the person skilled in the art, the amount of light that such a resonator reflects back depends strongly on the resonator's length.

The light reflected from optical resonator 15 is focused back into fiber 8 and reaches beamsplitter 7, where it is separated from the incoming light and projected onto an optical detector 16. As it will be clear to a person skilled in the art, the signal measured by optical detector 16 depends on the length of resonator 15 and therefore on the position of cantilever 3, which allows to measure the position and in particular a deflection or torsion of the same.

The design of the present invention has various advantages. For example, the distance between lens assembly 10 and cantilever 3 can be several 100 μm, which lowers the risk of damaging the optical components as compared to conventional sensors using fibers. In addition, the parasitic interaction between the cantilever and the optical components is reduced.

Furthermore, resonator 15 with one curved mirror (surface 12b) and one flat mirror (surface 3a) is more stable than a resonator with two flat mirrors. Because the light is focused on the cantilever and hence is far from parallel, the said resonator construction reduces the light losses in the cavity compared to the use of two flat mirrors.

The higher stability of the resonator simplifies the alignment of the device. In particular, the adjustment of the angle between cantilever top surface 3a and lens assembly 10 is less critical.

As the light rays are not broken at output surface 12b, the device works without readjustment independent on the medium present in resonator 15. In particular, the same system can e.g. be used for applications in air, vacuum and fluids, such as water or biological buffers.

In the example shown so far, two homogeneous lenses 11, 12 were used. It is also possible to combine the two lenses into a single lens—however, such a single lens would need to have a strongly curved input surface in order to focus a divergent incoming light field 9. Hence, for divergent incoming light fields 9, a lens assembly having at least two lenses is preferred.

Instead of using homogeneous lenses, it is also possible to use gradient refractive index lenses or a combination of homogeneous and gradient refractive index lenses. However, the output surface of the output lens should always be concave and parallel to the impinging wavefronts of the standing wave within resonator 15. In this respect, "a concave surface" is understood to denote that the lens is concave at the given surface.

In the embodiment of FIG. 1, the light reflected from resonator 15 is focused back into fiber 8. It is, however, also possible to place beam splitter 7 between fiber 8 and lens assembly 10.

Instead of using a fiber, light source 5 can also be located directly before lens assembly 10.

Preferably, the light entering lens assembly 10 has an intensity profile decaying with $(1/\exp(r))^2$, where r denotes the distance to the central axis of lens assembly 10—such a beam profile, as it is generated when using a TEM mode of the fiber, allows optimum focusing.

The optical sensor shown here is suitable to measure the deflection of cantilevers with extremely small dimensions (e.g. with a length of less than 50 μm and a width of less than 10 μm) and can be used for various scanning force microscopy applications or the measurement of the deflection of the cantilever-based physical, chemical or biological sensors, where the position of the cantilever depends on a parameter to be measured.

The optical lens assembly 10 shown here may be mounted on a piezoelectric positioning device that allows to position the light spot on different parts of the cantilever. This allows the measurement of the local deflection or torsion of the cantilever, which may be used to correct drifts of the distance between the cantilever and the optical assembly, to measure frictional forces giving rise to a torsion of the cantilever or to detect various longitudinal and torsional oscillatory modes.

The term cantilever is preferably used in the classical sense, designating a lever fixed at one end and being flexible at the second end, but it is also understood to comprise levers fixed at both end or membranes a central part of which is subject to a deviation to be measured.

While there are shown and described presently preferred embodiments of the invention, it is to be distinctly understood that the invention is not limited thereto but may be otherwise variously embodied and practiced within the scope of the following claims.

The invention claimed is:

1. A sensor comprising
a cantilever having a position,
a first mirror being arranged on said cantilever,
an optical resonator having a length that is dependent on the position of the cantilever,
a lens assembly for focusing light onto the cantilever and having an output surface facing the cantilever,
wherein
the position of the cantilever depends on a parameter to be measured,
said output surface is concave and forms a second mirror, and
said resonator is formed between said first and second mirror.

2. The sensor of claim 1 wherein said output surface is substantially parallel to impinging wavefronts of a standing optical wave within said resonator.

3. The sensor of claim 1 further comprising an optical fiber wherein said lens assembly projects an end of said optical fiber onto said cantilever.

4. The sensor of claim 1 wherein said output surface is coated with a reflective coating.

5. The sensor of claim 1 wherein said cantilever is coated with a reflective coating.

6. The sensor of claim 1 wherein said light is not broken at the output surface.

7. The sensor of claim 1 wherein said cantilever is a lever being fixed at a first end and deflectable at a second end.

8. The sensor of claim 1 wherein said resonator has a loss of less than 20% per round trip.

9. The sensor of claim 1 wherein said lens assembly is mounted to a positioning device for positioning a light spot on different parts of the cantilever.

10. A scanning force microscope comprising the sensor of claim 1.

11. A sensor comprising
a cantilever having a position,
a first mirror being arranged on said cantilever,
an optical resonator having a length that is dependent on the position of the cantilever,
a lens assembly for focusing light onto the cantilever and having an output surface facing the cantilever,
wherein
said lens assembly comprises an output lens having a convex first face and a concave second face, wherein said second face forms said output surface, the position of the cantilever depends on a parameter to be measured, said output surface is concave and forms a second mirror, and said resonator is formed between said first and second mirror.

12. The sensor of claim 11 wherein said lens assembly comprises an input lens for projecting a divergent incoming light field onto said output lens.

* * * * *